United States Patent [19]

Heggie et al.

[11] Patent Number: 4,760,697
[45] Date of Patent: Aug. 2, 1988

[54] MECHANICAL POWER REGENERATION SYSTEM

[75] Inventors: William S. Heggie, Dyfed, Wales; Anthony S. Davies, Gloucester, Canada

[73] Assignee: National Research Council of Canada, Ottawa, Canada

[21] Appl. No.: 896,102

[22] Filed: Aug. 13, 1986

[51] Int. Cl.⁴ .............................................. F16D 31/02
[52] U.S. Cl. ...................................... 60/408; 60/414; 60/494; 180/165
[58] Field of Search .................... 60/414, 408, 494; 180/165, 302

[56] References Cited

U.S. PATENT DOCUMENTS

| | | | |
|---|---|---|---|
| 2,755,898 | 7/1956 | Bell | 60/414 X |
| 4,227,587 | 10/1980 | Carman | 60/414 X |
| 4,246,978 | 1/1981 | Schulz et al. | 60/414 X |
| 4,351,409 | 9/1982 | Malik | 60/414 X |

Primary Examiner—Edward K. Look
Attorney, Agent, or Firm—James Creighton Wray

[57] ABSTRACT

A mechanical power regeneration system for a movable object comprising a sole variable displacement hydraulic pump being driven by the movable object, a first check valve connected between the output side of the pump and a first hydraulic line of a high pressure accumulator unit, a second hydraulic line of a low pressure accumulator unit, a second check valve connected between the second hydraulic line and the input side of the pump, a first controlled valve connected between the first hydraulic line and the input side of the pump and a second controlled valve connected between the second hydraulic line and the output side of the pump. When the movable object is to be slowed down by placing it in a braking mode, hydraulic fluid is transferred by the pump from the low pressure accumulator to the high pressure accumulator. When the movable object is placed in a drive mode, stored energy in the high pressure accumulator is transferred to the input side of the pump to apply a positive traction force to the movable object.

2 Claims, 2 Drawing Sheets

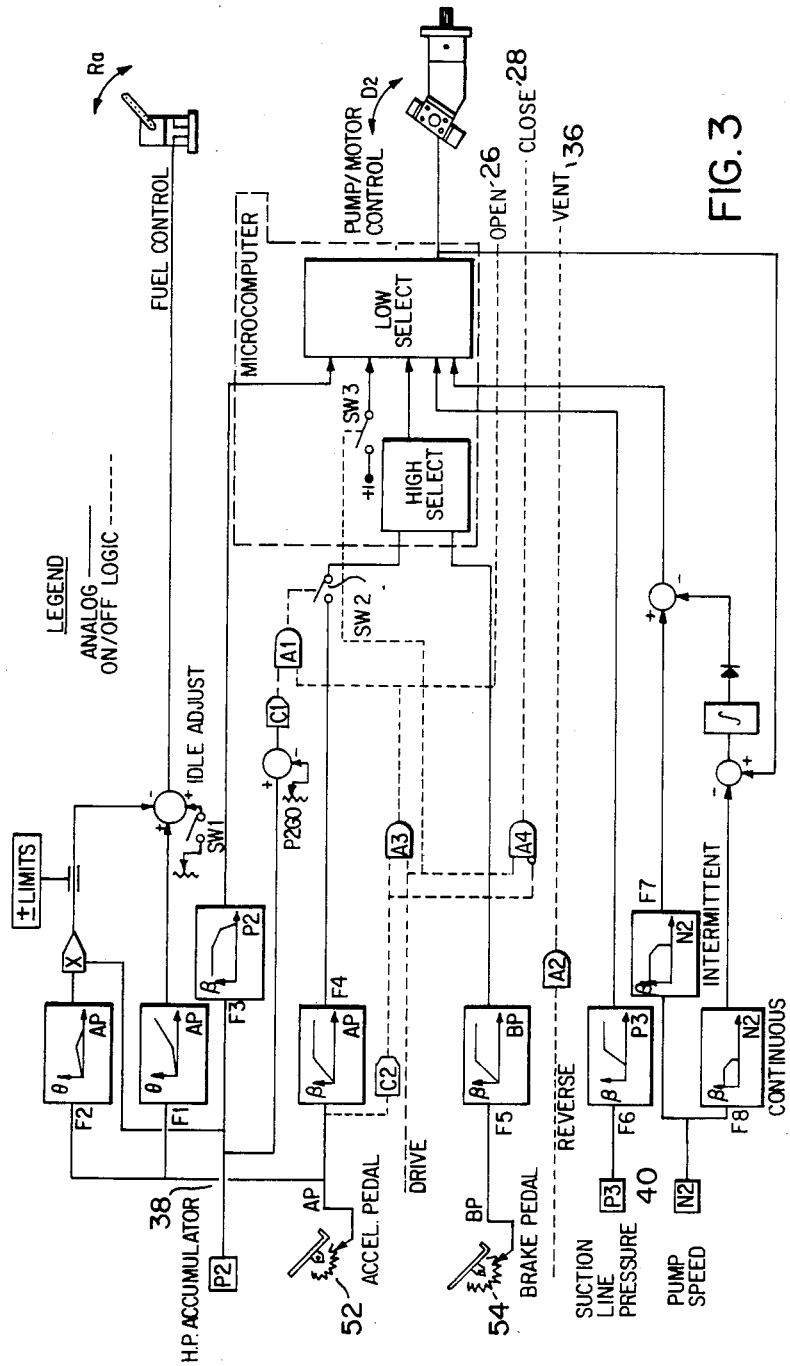

MECHANICAL POWER REGENERATION SYSTEM

This invention relates to a mechanical power regeneration system for storing and converting energy resulting from braking of a moving object such as a vehicle or elevator.

BACKGROUND OF THE INVENTION

In U.S. Pat. No. 4,679,396 of one of the inventors, William S. Heggie, corresponding to United Kingdom patent No. 2,065,836 (granted May 10, 1984) there is described a hydraulic transmission system which has been used successfully for vehicles. In that system two variable displacement hydraulic pump units are used and a hydraulic unit is coupled to the engine.

In other proposed systems two or more hydraulic pumps are used as well as a relatively large number of hydraulic components, one connected to the engine and one connected to the wheels through a clutch arrangement—see, for example, the description of a VOLVO system in the United Kingdom publication "The Automotive Engineer" April/May 1986, page 20.

SUMMARY OF THE INVENTION

It is an object of the invention to provide a mechanical power regeneration system which is of simpler construction.

According to the present invention there is provided a mechanical power regeneration system for a movable object comprising a sole variable displacement hydraulic pump in the power regeneration system, said sole hydraulic pump being driven by the movable object and thus may be positively driven by the movable object, a first check valve connected between the output side of said pump and a first hydraulic line of a high pressure accumulator unit, a second hydraulic line of a low pressure accumulator unit, a second check valve connected between said second hydraulic line and the input side of said pump, a first controlled valve connected between said first hydraulic line and said input side of said pump, a second controlled valve connected between said second hydraulic line and said output side of said pump, whereby, in operation, when said movable object is to be slowed down by placing it in a braking mode said first and second controlled valves are controlled by a control unit to be closed and hydraulic fluid is transferred by said pump from said low pressure accumulator to said high pressure accumulator through said second check valve and said first check valve, and when the movable object is placed in a drive mode and requires a positive traction force said control unit controls said first and second controlled valves to open and stored hydraulic energy in said high pressure accumulator is transferred via hydraulic fluid through said first controlled valve to the input side of said pump to apply a positive traction force to said hydraulic fluid movable object, the return path of said pump being from its output side through said second controlled valve to said low pressure accumulator unit.

More specifically the present invention provides a mechanical power regeneration system for a bus comprising a sole variable displacement hydraulic pump in the power regeneration system, said sole hydraulic pump being directly geared to the rear wheels of the bus and thus may be positively driven by the drive axle of said bus, a first check valve connected between the output side of said pump and a first hydraulic line of a high pressure accumulator unit, a second hydraulic line of a low pressure accumulator unit, a second check valve connected between said second hydraulic line and the input side of said pump, a first controlled valve connected between said first hydraulic line and said input side of said pump, a second controlled valve connected between said second hydraulic line and said output side of said pump, whereby, in operation, when the brakes of said bus are applied to place it in a braking mode said first and second controlled valves are controlled by a control unit to be closed and hydraulic fluid is transferred by said pump from said low pressure accumulator to said high pressure accumulator through said second check valve and said first check valve, and when the bus is placed in a drive mode and requires a positive traction force said control unit controls said first and second controlled valves to open and stored hydraulic energy in said high pressure accumulator is transferred through said first controlled valve to the input side of said pump to apply a positive traction force to said rear wheels, the return path of said pump being from its output side through said second controlled valve to said low pressure accumulator unit.

DESCRIPTION OF SOME EMBODIMENTS

Figure 1:
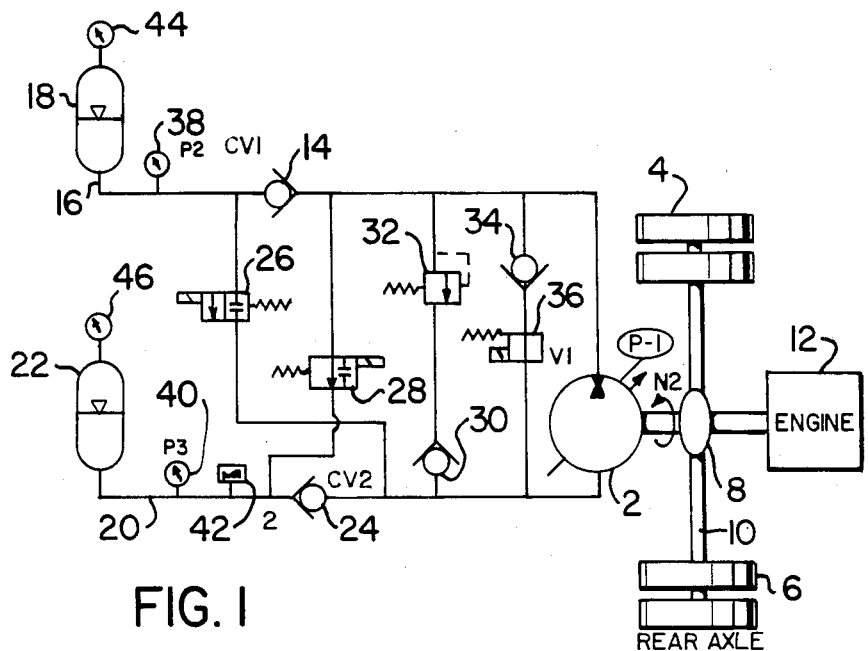
FIG. 1 is a diagrammatic representation of a mechanical power regeneration system for a rear engined bus, FIG. 2 diagrammatically illustrates, in block form, a controller unit with the connection lines to units in FIG. 1, and FIG. 3 diagrammatically illustrates the controller unit in greater detail.

Referring to FIG. 1, there is disclosed a mechanical power regeneration system suitable for use with a bus. The power regeneration system includes only one variable displacement hydraulic pump/motor unit 2 which is directly driven from the rear wheels 4 and 6 to be always positively driven thereby when the wheels turn. It is to be noted that the pump 2 is connected to the differential unit 8 on the drive axle 10 independently of the engine 12.

The output side of pump 2 is connected through a first hydraulic check valve 14 to a first hydraulic line 16 connected to the hydraulic connection of a high pressure accumulator unit 18.

A second hydraulic line 20 is connected to a low pressure accumulator 22. A second check valve 24 is connected between said second hydraulic line 20 and the input side of pump 2.

In FIG. 1, a first controlled valve 26 is shown connected between line 16 and the input side of pump 2 whilst a second controlled valve 28 is connected between the output side of pump 2 and the line 20.

A third check valve 30 is in series with a first controlled relief valve 32 and the series arrangement is connected across the output and input sides of said pump 2 with valve 30 arranged to pass fluid when the pressure at the output side of pump 2 is greater than the pressure at the input side of pump 2 and when said first controlled relief valve 32 is controlled to open.

A fourth check valve 34 is connected in series with a second controlled relief valve 36 across the input and output sides of said pump 2. Valve 30 is arranged to pass fluid when the pressure at the input side of pump 2 is greater than the pressure at the output side of pump 2 and when the second controlled relief valve 36 is controlled to open.

A first pressure indicating device, or gauge, 38 is connected to the first hydraulic line 16 whilst a second pressure indicating device, or gauge, 40 is connected to the second hydraulic line 20.

A PS-1 unit 42 is also connected to the second hydraulic line.

The high pressure accumulator unit 18 and the low pressure accumulator unit 22 are both pressure vessels containing a diaphragm or piston which separates nitrogen, (precharged to some lower working pressure), from the working hydraulic fluid. This is normally oil, the oil and gas being therefore nominally at the same pressure at all times, provided the piston is not contacting the end of the cylinder. A pressure indicating unit 44 is connected to the nitrogen end of the high pressure accumulator unit 18 whilst a pressure indicating unit 46 is connected to the nitrogen end of the low pressure accumulator unit 22.

In operation when the bus is travelling and the brake pedal is applied, the regenerative power train is placed in a braking mode. The bus wheels 4 and 6, being directly connected to the variable displacement hydraulic pump 2, cause the pump 2 to operate so as to transfer oil from the low pressure accumulator 22 to the high pressure accumulator 44, further compressing the nitrogen therein. The energy for this is imparted to the compressed nitrogen at the expense of the vehicle's kinetic energy.

In the braking mode, a controller unit 50 (FIG. 2) controls valves 26, 28, and 36 to be closed so that the path of the oil is from the low pressure accumulator unit 22 through the second check valve 24, through the variable displacement hydraulic pump 2, through the first check valve 14 to the high pressure accumulator unit 18. Every time the brake pedal is actuated, for normal levels of retardation, the hydraulic system comes into operation to retard the vehicle without use of the service brakes. In this condition, the pump 2 recharges the accumulator 18.

When the bus is driven normally, in its drive mode, and the bus initially requires a positive traction force then action on the accelerator pedal causes the controller unit 50 (FIG. 2) to open valves 26 and 28 whilst maintaining valves 32 and 36 closed. Any stored energy in the high pressure accumulator unit 18 is re-applied to the driving wheels 4 and 6, by discharging the high pressure oil through valve 26 to the inlet side of pump 8. The path of the oil is then from the outlet side of pump 2 through the valve 28 to the low pressure accumulator unit 22.

It is to be noted that only one pump 2 and two controlled valves 26 and 28 are required for operation of the bus as described above. Valves 32 and 36 are merely relief valves. Valve 36 is controlled to open when the bus is placed in a reverse mode so as to act as a relief line for the hydraulic pressure produced by pump 2. The path of the oil is from the inlet side of pump 2, through relief valve 36, through check valve 34 back to the output side of pump 2.

SUMMARY—PRINCIPLES OF OPERATION

CRUISE MODE (No hydraulic braking or traction)

Pump 2 - displacement at minimum
Engine fuel lever = f (Accelerator pedal position.)
Valves 26 and 28 open.

BRAKING MODE

Pump 2 - displacement = f (Brake pedal position, (pressure at gauge 40)
Valves 26 and 28 closed.
Oil is transferred from low pressure accumulator 22 to high pressure accumulator 18, providing retarding force to road wheels via pump 2.

HOLD MODE (High pressure accumulator energy hold)

Valve 26 closed.
Valve 28 open.

HYDRAULIC TRACTION

Pump 2 - displacement = f (Accelerator pedal)
Engine fuel lever = f (Accelerator pedal, pressure at gauge 38)
Valves 26 and 28 open.
High pressure oil in accumulator 18 discharges to accumulator 22 via pump 2, providing a tractive force to the road wheels.
On exhaustion of high pressure accumulator charge, pump 2 displacement is set to minimum giving the CRUISE mode above.

REVERSE

Valve 26 is closed. Valve 28 is open.
Relief valve 36 is open.
High pressure accumulator charge is held.
Oil transfer from pump is recirculated.

A significant finding we made was that the thermodynamically ideal accumulator (that which provides a given energy storage capacity at the minimum gas volume), does not provide the optimum performance, considering overall energy conservation, over the range of real driving situations.

The performance analyses presented here have permitted the design parameters for a prototype vehicle to be optimised to significant advantage.

PUMP SIZE AND GEARING

In practice, it is necessary to speed up the pump drive in order to obtain adequate energy conversion rates using any of the currently available sizes of hydraulic pumps.

In predicting the retardation, it is necessary to relate the hydraulic pressure, to the retarding tractive effort.

$$\text{Pump power } PP = DP \cdot dP(Np/60) \text{ kW} \quad (1)$$

$$\text{where } Np = VEL \cdot RR \cdot DR/RS \text{ revs/min.} \quad (2)$$

$$\text{Tractive force } TF = PP/VEL \cdot 3600 \text{ N} \quad (3)$$

$$= DP \cdot dP(VEL \cdot RR \cdot DR/RS/60) \cdot \quad (4)$$

$$(3600/VEL) \text{ N}$$

where:

| Symbol | Description | Unit |
| --- | --- | --- |
| dP = | Pump differential pressure | MPa |
| DP = | Pump Displacement | /revolution |
| DR = | Pump gearbox speedup ratio | |
| LOP = | Lower Operating Pressure | MPa |
| Np = | Pump speed | revs/min |
| PP = | Pump Power | kW |
| RR = | Driveshaft speed at RS | revs/min |

-continued

| Symbol | Description | Unit |
|---|---|---|
| RS = | Vehicle Road Speed for RR | km/h |
| SPD = | Specific Pump Displacement | /m travel |
| TF = | Tractive Force | N |
| VEL = | Vehicle velocity | km/h |

Eq. (4) can usefully be simplified by introducing the concept of Specific Pump Displacement, which may be defined as the volumetric displacement of the hydraulic pump per unit of linear vehicle travel.

i.e. Specific Pump Displacement $SPD =$ (5)

$$DP \cdot DR \cdot RR/RS \cdot 60/1000/m$$

giving $TF = SPD \cdot dP \cdot 10 \text{ N}$ (6)

ACCUMULATOR SIZE AND CHARGE PRESSURE

R. Sandri and W. S. Heggie, in "Heat Transfer and Energy Storage in Pneumatic Accumulators". International Symposium, Advanced and Hybrid Vehicles, University of Strathclyde, September 1984, have shown the fundamental gas characteristics in the pressure range of interest 20–37.9 MPa (3–5000 psi). From this, the gas volume and pressure limits required for the storage of a given quantity of energy can be determined. There is an optimum LOP of approximately 10.4 MPa (1530 psi).

It should be noted that the relationship between the specific energy storage and the LOP is a general relationship, whereas the relationship between the actual gas volume and the LOP is dependent on the quantity of energy to be stored.

In either case, the actual values are affected by the pressure in the low pressure accumulator over the cycle.

The most obvious advantage obtained by raising the LOP, is the corresponding increase in tractive effort obtained in accordance with Eq. (6). There will however be a severe reduction in energy storage capacity if the LOP is increased much above 20 MPa (3000 psi).

HYDRO-PNEUMATIC ENERGY STORAGE CHARACTERISTICS

There are two characteristics of special note, related to the fact that as the magnitude of the stored energy is increased within a given accumulator, there is a simultaneous reduction in gas volume and increase in pressure.

Firstly, the quantity of energy stored at any instant is dependent on the volume displaced by the oil. This corresponds to the distance travelled during stopping, assuming a constant pump displacement. Secondly, as the gas pressure increases as a power function of the volume reduction, the hydraulic oil pressure, (equalling the gas pressure), will give rise to a tractive retarding force also increasing as a power function of the distance travelled during the retardation, with the same pump displacement.

REQUIRED SYSTEM PERFORMANCE

Little information was available concerning the actual braking cycles involved in typical city bus routes. Therefore some data was collected from a bus travelling along a 6 mile radial route between a city and its suburb. It was found that the majority of the stops occurred at an average retardation rate not exceeding 1.68 m/s (5.5 ft/sec); and that the majority of the stops occurred in the 32 to 48 km/h (20 to 30 mph) range. The following performance targets for the energy recovery system were derived from this data:

1. The system should be able to fully store the available kinetic energy for a 48 km/h (30 mph) stop.
2. The system should be capable of providing an average retardation rate of 1.68 m/s (5.5 ft/sec) for a stop from 32 km/h (20 mph).

Due to the gas compression characteristics mentioned above, this target implies that the 48 km/h (30 mph) stop, would exceed the 1.68 m/s $^2$ (5.5 ft/sec$^2$) limit at the same pump displacement.

In the test bus, free piston cylindrical accumulators units were used. With the bladder type accumulator, particularly when mounted in the horizontal position, the bag tends to take an off-centre attitude, resulting in an oil velocity differential between opposite sides, tending to further draw the bag to the lower velocity side. This can cause fluttering resulting in bag damage and pressure fluctuation.

A bent axis multiple co-axial piston was used as a pump/motor 2 because it displays several advantages over swashplate devices, including better overall efficiency especially at low displacement.

Pilot operated check valves were used where 100% shut off is important and also to simplify valve sequencing operations.

Figure 2:
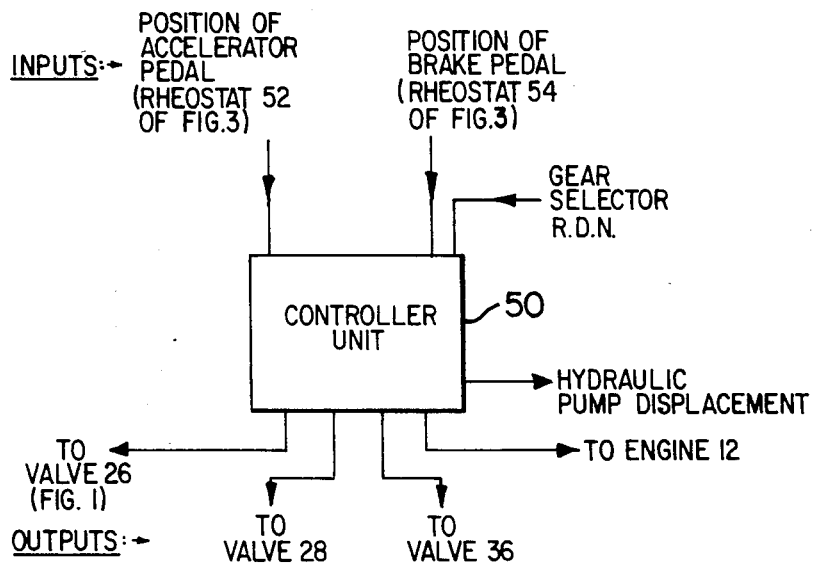

In the block schematic of the controller unit 50 in FIG. 2, the inputs to the controller unit are from the accelerator pedal of the bus and the brake pedal via appropriate rheostats as shown in greater detail in FIG. 3. An input is also obtained from the gear selector of the bus to indicate when gear is in reverse (R), drive (D) or neutral (N).

The outputs of controller unit 50 go to valve 26, 28, 36 and to engine 12 (FIG. 1). A connection is also shown in relation to the Hydraulic Pump displacement.

The Controller unit is shown in greater detail in FIG. 3. The nomenclature used will be clear from FIG. 3 and is standard to that used by persons skilled in the art. Certain graphical representations are included for clarity.

The processor used on the bus was a custom designed unit based on a single board microcomputer utilizing an 8086 CPU. The system was designed to act as both a system controller and data acquisition system. The control program and test data were stored on a removable bubble memory.

Referring to FIG. 3, driver input is provided by a modified gear shift and potentiometers 52 and 54 operated by the accelerator (Ap) and the brake pedal (Bp). Five outputs control the three valves 26, 28 and 36, the fuel rack (Ra) and the pump/motor displacement (D2).

Functions F1 and F2 modify the output of the controller 50 to the fuel rack, melding engine with accumulator power to provide a repeatable response to the accelerator (Ap) regardless of the state of charge of the high pressure accumulator 18 as indicated by gauge 38 (FIG. 1).

The double switch (SW) disables displacement control (D2) of the pump/motor unit 2 of FIG. 1 and provides fuel rack control as a direct function of the accelerator potentiometer 52 when reverse or neutral modes are selected. The same is true when operating with the high pressure accumulator 18 fully discharged.

In FIG. 3, F3 is used to attenuate pump displacement when the accumulator is fully charged to limit thermal build up at the relief valve. F4 and F5 provide modulation of the hydraulic tractive effort during acceleration and braking respectively.

Function F7 backs off Pump/Motor displacement as a function of speed to comply with speed load restrictions.

Function F6 acts similarly to F7 except that it is based on inlet pressure as an anti-cavitation protection.

The latter two functions were devised in order to design safely for the maximum ratings of the hydraulic transmission system. The alternative, of course, would be a larger unit or gearing down the speed with a consequent loss of performance.

In FIG. 3 the setting of the movable arm of potentiometer 52 is dependent on the position of the accelerator pedal of the bus. The setting determines the magnitude of input signal (AP) provided to the microcomputer unit. Similarly, the setting of the movable arm of potentiometer 54 determines the magnitude of the input signal (BP) provided to a second input of the microcomputer unit. The microcomputer unit is designed to analyse its inputs and to provide corresponding control signals to the controlled valves 26 and 28 (FIG. 1).

The microcomputer is also responsive to the gear lever of the bus being placed in reverse. A further control signal is then provided to controlled relief valve 36 (FIG. 1) whereby the hydraulic fluid from the pump 2 is recirculated through the controlled relief valve 36 and check valve 34.

There has been described, a system designed to regenerate mechanical energy, being separate and distinct from the primary power transmission which connects a prime mover (i.e. internal or external combustion engine, electric motor etc.) to its load; the system comprising:

A variable displacement hydraulic unit which may function as either a pump or a motor, and which is directly coupled to the load; a high pressure, hydropneumatic accumulator for energy storage; a low pressure hydro-pneumatic accumulator, to serve as a reservoir of oil of adequate pressure to satisfy the requirements of the pump/motor unit, an energy storage sensor, which provides a measure of the energy level in the energy storage unit, for use by regenerative power control system, and a control system which controls the prime mover power level, the power regenerator power level, and the active control valves, using as operator inputs, only such conventional controls as accelerator and brake pedals, and primary transmission control inputs.

Two active controllable valves determine the control mode of the regenerative power system. The power regenerator may be separable from the load by means of a mechanical clutch, under automatic control. The prime mover may be disconnected from the load, under automatic control. The regenerative power controller may generate a control demand on the primary power transmission, for the selection of a drive ratio.

The power regenerator and the energy storage devices may, of course, be electrical.

It will be readily apparent to a person skilled in the art that a number of variations and modifications can be made without departing from the true spirit of the invention which will now be pointed out in the appended claims.

We claim:

1. A mechanical power regeneration system for a movable object having a primary power transmission connecting a prime mover to a load, said system being separate and distinct from the primary power transmission, comprising:
   (a) a variable displacement hydraulic pump assembly including a pump in the power regeneration system,
   (b) said hydraulic pump being positively driven by the movable object in at least one operational mode of said movable object,
   (c) a first check valve connected between the output said of said pump and a first hydraulic line of a high pressure accumulator unit,
   (d) a second hydraulic line of a low pressure accumulator unit,
   (e) a second check valve connected between said second hydraulic line and the input side of said pump,
   (f) a first controlled valve connected between said first hydraulic line and said input side of said pump,
   (g) a second controlled valve connected between said second hydraulic line and said output side of said pump,
   (h) whereby, in operation, when said movable object is to be slowed down by placing it in a braking mode said first and second controlled valves are controlled by a controller unit to be closed and hydraulic fluid is transferred by said pump from said low pressure accumulator to said high pressure accumulator through said second check valve and said first check valve, and
   (i) when the movable object is placed in a drive mode and requires a positive traction force said controller unit controls said first and second controlled valves to open and stored hydraulic energy in said high pressure accumulator is transferred via hydraulic fluid through said first controlled valve to the input side of said pump to apply a positive traction force to said movable object, the return path of said hydraulic fluid pump being from its output side through said second controlled valve to said low pressure accumulator unit,
   (j) a third check valve connected in series with a controlled relief valve across the input and output sides of said pump, and
   (k) said microcumputer unit providing a control signal to said controlled relief valve when the movable object is in a reverse mode whereby when the movable object is reversed, hydraulic fluid is recirculated around the pump through said controlled relief valve.

2. A mechanical power regeneration system for a bus comprising:
   (a) a sole variable displacement hydraulic pump in the power regeneration system,
   (b) said sole hydraulic pump being directly geared to the rear wheels of the bus and thus is positively driven by the drive axle of said bus in at least one operational mode of said bus,
   (c) a first check valve connected between the output side of said pump and a first hydraulic line of a high pressure accumulator unit,
   (d) a second hydraulic line of a low pressure accumulator unit,
   (e) a second check valve connected between said second hydraulic line and the input side of said pump, (f) a first controlled valve connected between said first hydraulic line and said input side of said pump, (g) a second controlled valve connected between said second hydraulic line and said output side of said pump, (h) a first potentiometer having a movable arm responsive to the position of an accelerator pedal of the bus to provide a first input to a microcomputer unit, (i) a second potentiometer having a movable arm responsive to the position of a brake pedal of the bus to provide a second input to said microcomputer unit, and (j) said microcomputer unit providing corresponding control signals to said first and second controlled valves, (k) a further check valve connected in series with a controlled relief valve across the input and output sides of said pump, and (1) said microcomputer unit providing a control signal to said controlled relief valve when the bus is in a reverse mode whereby when the bus is reversed, hydraulic fluid is recirculated around the pump through said controlled relief valve, (m) whereby, in operation, when the brakes of said bus are applied to place it in a braking mode said first and second controlled valves are controlled by said microcontroller unit to be closed and hydraulic fluid is transferred by said pump from said low pressure accumulator to said high pressure accumulator through said second check valve and said first check valve, and (n) when the bus is placed in a drive mode and requires a positive traction force said controller unit controls said first and second controlled valves to open and stored hydraulic energy in said high pressure accumulator is transferred through said first controlled valve to the input side of said pump to apply a positive traction force to said rear wheels, the return path of said pump being from its output side through said second controlled valve to said low pressure accumulator unit.

* * * * *

UNITED STATES PATENT OFFICE
CERTIFICATE OF CORRECTION

Patent No. 4,760,697              Dated August 2, 1988

Inventor(s) William S. Heggie et al.

It is certified that error appears in the above-identified patent and that said Letters Patent are hereby corrected as shown below:

Column 8, line 13, change "said" (first occurrence) to "side".

Signed and Sealed this

Sixth Day of December, 1988

Attest:

DONALD J. QUIGG

Attesting Officer

Commissioner of Patents and Trademarks